Nov. 19, 1963 F. S. HARRIS 3,111,629

REACTANCE OR PARAMETRIC AMPLIFIER

Filed Jan. 7, 1959 3 Sheets-Sheet 1

INVENTOR.
FRANCIS SAMUEL HARRIS
BY Alfred H. Rosen
ATTORNEY

Nov. 19, 1963 F. S. HARRIS 3,111,629

REACTANCE OR PARAMETRIC AMPLIFIER

Filed Jan. 7, 1959 3 Sheets-Sheet 2

INVENTOR.
FRANCIS SAMUEL HARRIS
BY
Alfred H Rosen
ATTORNEY

INVENTOR.
FRANCIS SAMUEL HARRIS
BY Alfred H. Rosen
ATTORNEY 3,111,629
REACTANCE OR PARAMETRIC AMPLIFIER
Francis Samuel Harris, Medfield, Mass., assignor to Microwave Associates, Inc., Burlington, Mass., a corporation of Massachusetts
Filed Jan. 7, 1959, Ser. No. 785,384
8 Claims. (Cl. 330—4.9)

This invention relates to reactance (sometimes called "parametric") amplifiers and more particularly to such amplifiers of the cavity type employing a variable reactance device in circuit between an inner electrode and the outer wall of the cavity.

In the reactance amplifier, two or more signals are mixed by a non-linear reactance to produce amplification. The reactance of a storage element, an inductor or a capacitor, is varied, and from this variation of the reactance parameter the names "parametric amplifier" and "reactance amplifier" are derived. Typical reactance amplifiers might consist primarily of an R.F. pump oscillator, a solid-state diode, and a length of waveguide. The use of graded p-n junctions as low-loss non-linear capacitors at microwave frequencies, to make low-noise amplifiers, is described by A. Uhlir in Proceedings of the I.R.E., vol. 46, No. 6, June 1958, pages 1099–1115.

Prior cavity type reactance amplifiers had been characterized by many disadvantages, including extremely critical dimensions and unique problems of controlling various modes of electrical oscillation therein. For example, cavity amplifiers employing rectangular waveguide type cavities are liable to have unpredictable modes in great numbers and it is necessary in devices of this kind very carefully to locate mode controlling structures in order to control the modes which are present in the cavity. It is necessary that the amplifier be able to support standing waves of the pumping, signal and idler (i.e., difference of pump or harmonic thereof and a signal frequency) frequencies, and very often the length, breadth, and thickness of the cavity, as well as the locations of mode controlling pins are extremely critical. In prior hollow waveguide type devices it has been extremely difficult to relate these three frequencies in any way which will make the device easier to design.

According to the present invention a reactance amplifier compriss an outer elongated conductor supplied with an internal conductor substantially parallel with the outer conductor (this may but need not necessarily be a cylindrical cavity with a coaxial conductor), and a variable reactance device coupled between a wall of the cavity and the internal conductor. The part of the cavity which includes the internal conductor is made electrically one or an odd number of quarter-waves long, in the direction of the internal conductor, at the signal frequency. This constitutes essentially a standing wave type line, and differs from purely hollow cavities in that it does not depend on any physical dimension except the length. Signal input and output terminals, and a pump frequency input terminal are coupled to the amplifier. The internal conductor constrains all the used signal, pump and idler frequencies, to approximately the same propagation velocity.

By the provision of adjustable capacitance between the internal conductor and the outer wall, and in some embodiments of means to adjust the inductance of the internal conductor, this line is able to be adjusted for resonance, to a satisfactory degree, to the pumping frequency, the signal frequency, and the idler frequency, simultaneously. In the design of one embodiment of the invention, these three frequencies are all harmonically related, the pump frequency being, for example, approximately four times the signal frequency, and the idler frequency (i.e., the "lower side-band" difference frequency) being approximately three times the signal frequency. In other embodiments, including those having the aforementioned inductance adjusting means, the pump, idler and signal frequencies need not be so related, and pump frequencies can be chosen with greater freedom, for a given signal frequency. In either case, the pump frequency need not be one which is exactly resonant with the cavity; a pump oscillator which is off-resonance may deliver less power to amplify the signal, for the same oscillator power output, than one which is resonant, but this can be overcome by increasing the pump oscillator output.

Any non-linear capacity device coupled between the internal conductor and the outer cavity wall may be employed. The pumping energy may be introduced through this device or at another location in the cavity. The input and output signals can be respectively coupled to and from the cavity in such a fashion that in the absence of pump energy to the cavity the input signal is passed through the cavity with little or no loss.

It is an object of this invention to provide an improved reactance amplifier which is simple to construct and operate, which has improved low noise characteristics, and which eliminates complex-mode controlling problems. It is another object of the invention to provide a reactance amplifier in which the pump frequency, and consequently the idler frequency, can be chosen substantially at will, for any given signal frequency, and the pump frequency can be introduced into the amplifier at a wide variety of locations. It is a further object of the invention to provide a reactance amplifier which passes the signal substantially unaltered in the absence of pump energy and functions to amplify the signal when pump energy is introduced.

Other and further objects and features of the invention will appear from the following description of certain embodiments thereof. The description refers to the accompanying drawings, wherein.

Figure 1:
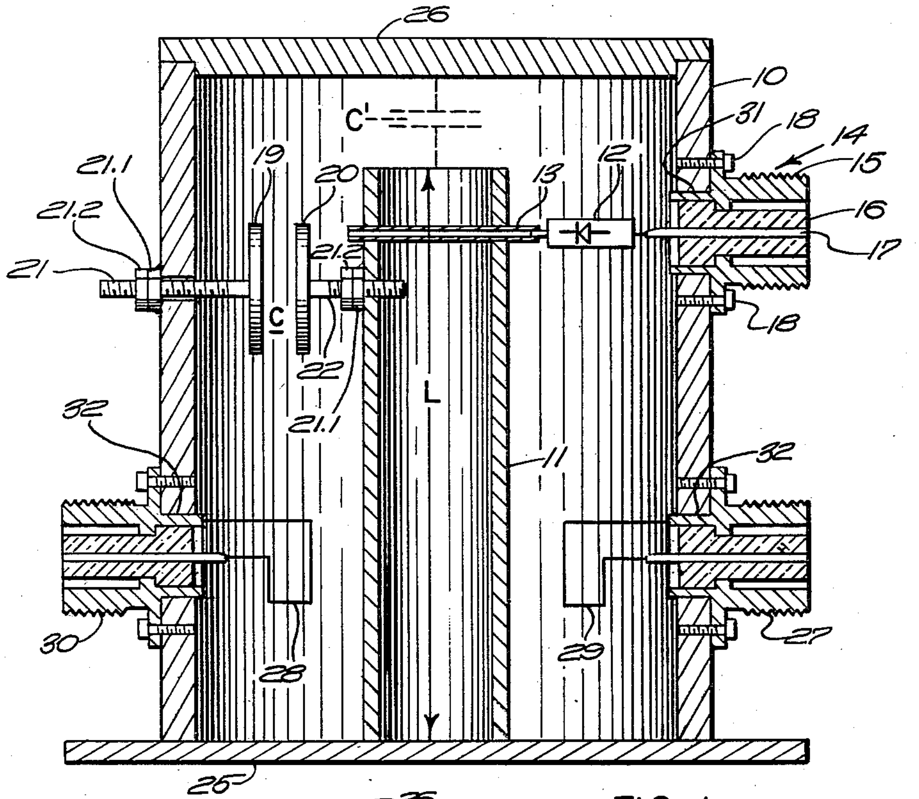
FIG. 1 illustrates in vertical section a first embodiment of the invention employing a cylindrical outer conductor and a coaxial inner conductor connected together at one end of each.

Referring to FIG. 1, a cylindrical conductor 10, which may be made of brass for example, is affixed to a conductive base 25 and supplied with a conductive cover 26 providing an enclosed cavity. A cylindrical conductor 11 of length L is affixed to the base 25 and extends coaxially inside the outer conductor 10 toward but not quite reaching the cover 26. A voltage-variable capacitance diode 12, which is often called a "varactor," is connected at one side to the inner conductor 11 via a tubular electrical connector 13 which is mounted in and diametrically across the inner electrode 11 near the upper, or free, end thereof, and at the other side to the inner conductor 17 of a coaxial fitting 14 of a well-known kind. The coaxial fitting 14 comprises a cylindrical externally-threaded collar 15, and a phenolic or other electrically non-conductive sleeve 16 in which the central conductor 17 is held. The fitting 14 is mounted on a wall of the outer conductor 10 by means of screws or other connectors 18, and extends through an opening 31 in the wall. A tuning capacitor C comprising plates 19 and 20 mounted respectively on the inner wall of the outer conductor 10 by means of a screw 21 and on the outer wall of the inner conductor 11 by means of a screw 22, is employed to adjust the resonant frequency of the cavity formed by the conductors 10 and 11 to the signal frequency. Adjustment is made and locked by means of pairs of internally threaded nuts 21.1 and 21.2, the first 21.1 being fixed as by brazing to the electrode 10 or 11, and the second 21.2 being in each case free to turn. An input terminal 29 in the form of a loop is provided in the cavity by means of a coaxial fitting 27 mounted on and extending into the outer conductor 10 through an opening 32. A similar output loop 28 is provided and held in a diametrically opposite position in the cavity by a coaxial fitting 30 through an opening 33. The coaxial fittings 27 and 30 are similar to the first-mentioned coaxial fitting 14, and are similarly mounted on the outer conductor 10.

The variable capacitor C need not include both plates 19 and 20. Either one of these electrodes may be dispensed with if desired, and conveniently the inner electrode 20 and its screw mounting 22 may be dispensed with. Furthermore, the capacitor need not be mounted as shown. For example, the screw 21 and plate 19 may be mounted in the cover 26 and adjusted toward and away from the free end of the inner conductor 11, as in indicated in dotted line at $C^1$. The input and output signal terminals 29 and 28 may if desired be made adjustable so that they can be moved respectively toward or away from the inner conductor 11.

In operation an input signal is introduced by means of the input loop 29, and pump energy is provided at the first-mentioned coaxial terminal 14, directly to the voltage-variable-reactance diode 12. An amplified output signal will appear in the output loop 28. The manner in which this result is obtained will be explained with reference to FIG. 2.

Figure 2:
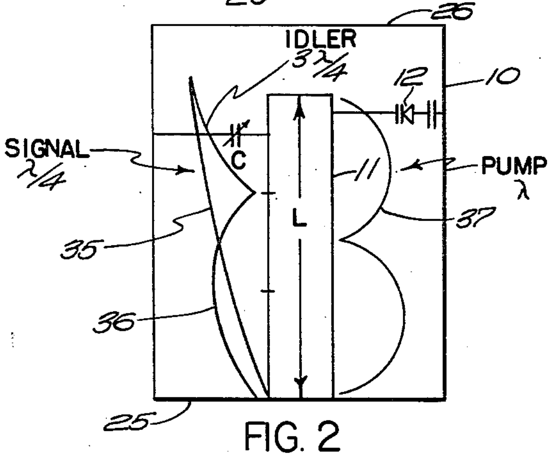
FIG. 2 is a diagram to explain the operation of the invention as illustrated in FIG. 1.

FIG. 2 illustrates diagrammatically the outer conductor 10 and inner conductor 11, base 25 and cover 26, variable capacitor C and voltage-variable-reactance device 12. The coaxial cavity section of length L comprised of the inner conductor 11 and the outer conductor 10 is adjusted by means of the variable capacitor C to be, in the present illustration, one-quarter wavelength long for energy therein of the signal frequency, represented by the quarter-wave curve 35, in the fundamental coaxial mode, TEM. Because of the internal conductor 11, the fundamental mode will predominate for all frequencies, so that the pump, idler and signal frequencies will propogate at approximately the same phase velocity in the coaxial cavity section. Depending on the length L, this section will be, for example, approximately three-quarters of a wavelength long, as represented by the three-quarter wave curve 36, for a second frequency greater than the signal frequency, and approximately one wavelength long, as represented by the full-wave curve 37, for a third frequency greater than the signal frequency. The reason for this is that increasing the length L of the internal conductor 11 increases the inductance of the coaxial cavity; for a given range of inductance the variable capacitor C can tune the cavity to a given signal frequency, but in the process the idler frequency to which the cavity will also resonate is changed. In order for the embodiment of FIG. 1 to be useful at specific frequencies, for example a signal frequency at 500 mc./sec., and pump frequency at 2000 mc./sec., the electrical length L of the coaxial cavity should be such that when it is approximately $\lambda/4$ for the signal frequency, it is approximately $3\lambda/4$ for the idler frequency (1500 mc./sec.) and approximately $\lambda$ for the pump frequency.

The variable reactance device 12 need not be coupled to the inner conductor 11 at or near its free end. As shown in FIG. 1, when the resonances are adjusted as illustrated in FIG. 2, the variable reactance device is near an antinode or high voltage region of signal voltage, and is simultaneously located in a region where the pump voltage is appreciable. In such a location a voltage variable reactance device can be influenced by all these voltages, but will be relatively uninfluenced by the first harmonic of the signal voltage, and will be at a point where the pump signal is near a voltage node and a current maximum (i.e., at or near a low impedance point with respect to the pump frequency). Thus, as shown in FIG. 2, the device 12 is simultaneous at a point of high impedance for the signal and idler frequencies, and low impedance for the pump; these are favorable conditions for producing signal amplification. A voltage variable reactance device can be moved to other locations in the coaxial cavity section. Locating the variable reactance device 12 in such other positions will alter its input impedance conditions, and permit a choice of pump signal input feed—i.e., series or parallel, for example.

The length L can be chosen to be approximately any odd number of quarter wavelengths long with reference to the signal frequency, if desired. Likewise the length L may be more than one wavelength long with respect to the pump frequency, and more than $3\lambda/4$ relative to the idler frequency. With such arrangements, suitable operable locations for the variable reactance device 12 will be found more uniformly distributed along the coaxial cavity section.

It is characteristic of the invention that a resonance at the pump frequency is not necessary. Such a resonance will affect the power put into amplification of the signal introduced at the input terminal 29, but lack of it can be compensated for by increasing the power level of the pump energy source (not shown). No pump oscillator is shown, since suitable oscillators are well known to those skilled in the art. Suitable specifications for a 2000 mc./sec. oscillator are:

Tuning range: 5% above and below the center frequency
Power input: adjustable in the 1 to 100 mw. range
Stability: warm up drift of 0.2% is satisfactory
Calibration: 1% intervals The tuning control should be calibrated so that it can be reset to a predetermined frequency, for convenience in taking data and setting up the amplifier. Link coupling from the oscillator to the cavity is recommended for convenience in adjusting the output level.

Higher orders of the pump frequency can also be used with success. For example, in one configuration adjusted for a pump center frequency twice the signal frequency (i.e., signal frequency $=f$, pump frequency$=2f$), comparable results were obtained with pump center frequencies of $3f$, $4f$, $5f$, $6f$ and $7f$.

Figure 3:
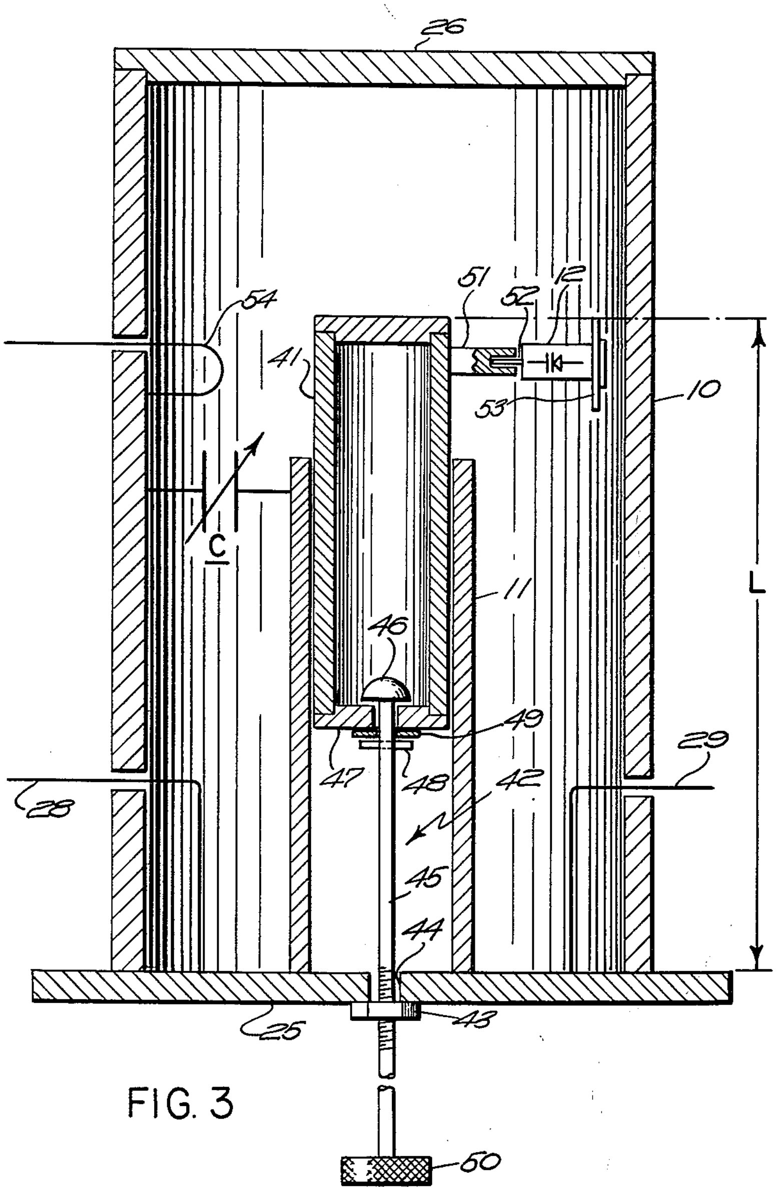
FIG. 3 illustrates in vertical section a second embodiment of the invention similar to FIG. 1 but in which the coaxial inner conductor is adjustable in length.

The embodiment of the invention shown in FIG. 3 permits adjustment of the length $l$ to accommodate pumping at any desired frequency, thereby permitting the convenience of using an existing oscillator for pumping. In this embodiment, in which parts having the same function as corresponding parts of FIG. 1 bear the same reference characters, the inner conductor 11 is fitted with a telescopically extendable conductor 41, which in turn can be moved axially with respect to the inner conductor 11 by means of a lead screw assembly 42. This assembly comprises, for example, an internally threaded nut 43 fastened as by brazing or soldering to the outer surface of the base 25, adjacent a bore 44 through which the lead screw 45 freely passes. The screw has a head 46 engaged inside the base 47 of the extendable conductor 41, and a pin 48 driven through the screw at a point just outside the base 46. The pin bears on a washer 49. A knurled knob 50 is used to turn the screw 45 in the nut 43 and thereby adjust the extension of the extendable conductor 41. Obviously, other adjusting mechanisms may be employed; the one shown is by way of example only.

The diode 12 is held in a holder 51 which is affixed as by brazing or soldering to the side of the extendable conductor 41 near the free end thereof, and has a socket at its free end to receive the pin 52 at one end of the diode. The other end of the diode 12 is fitted with a capacitor plate 53, which electrically couples that end of the diode to the adjacent wall of the outer conductor 10 of the cavity. The pump signal is, in this embodiment, introduced via a separate coupling loop 54. It will be appreciated that the loop 54 and the input and output terminals 29 and 28, respectively, are equivalent structures, and that fittings like the fittings 14, 27 and 30 of FIG. 1 may be employed if desired. For the sake of simplifying the illustration of FIG. 3, such fittings have been omitted, and the variable capacitor C has been illustrated diagrammatically.

In order to make the amplifier of FIG. 3 useful with a given pump frequency, the length L of the complete inner electrode 11 and 41 is adjusted for the appropriate idler frequency (pump frequency minus signal frequency, for example), and the variable capacitor C is adjusted for quarter wave resonance with the signal frequency. Bearing in mind that higher-order pump frequencies are also useful, the idler frequency to which adjustment is made may be chosen with reference to the lower order of the pump frequency which is actually intended to be used. Furthermore, an amplifier designed to adjust the coaxial section length L can be used over a wide band of signal frequencies. For example, an amplifier designed for use at a signal frequency of 500 mc./sec. was made useful from 200–500 mc./sec. with this structure.

Figure 4:
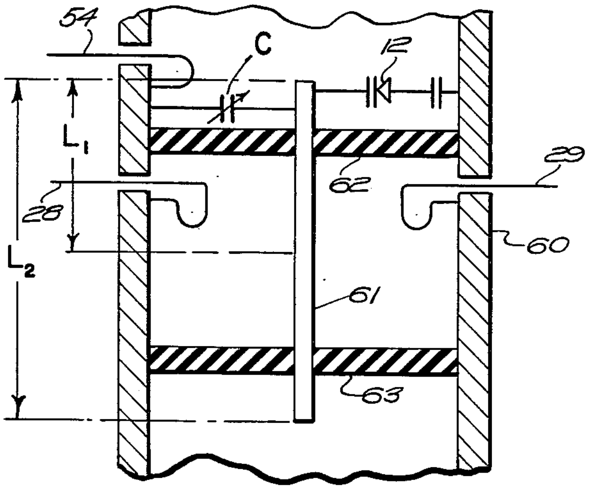
FIG. 4 illustrates in vertical section a third embodiment of the invention employing a cylindrical outer conductor and a coaxial inner conductor which is not connected at either end to the outer conductor.

FIG. 4 shows an embodiment of the invention in which a cylindrical electrical conductor 60 is fitted with a concentric inner electrical conductor 61 supported by two annular electrical insulators 62, 63. The variable reactance device 12 is connected between these conductors, in any of the manners described above, as is a variable capacitor C. Pump and signal input and output coupling means 54, 29 and 28, respectively, which are similar to elements bearing the same reference characters in FIGS. 1 and 3, are provided in this embodiment as in those already described.

The length L, in FIG. 4 is equivalent to the length L in FIGS. 1 and 3, and may for example be approximately $\lambda/4$ relative to the signal frequency. The length $L_2$ is twice $L_1$. The embodiment of FIG. 4 may be regarded as substantially similar to the embodiment of FIG. 1 with its mirror image added, that is, two devices back-to-back, each of which comprises an amplifier of electrical length L equal effectively to approximately one quarter or any other odd number of quarter waves at the signal frequency.

As will be apparent, it is not necessary for the inner electrical conductor to be connected to a wall of the cavity, nor is it necessary for the cavity to be closed at either end. It is only necessary to provide a field confining structure at least in part surrounding the inner electrode so that all the used modes are constrained to approximately the same propagation velocity in the amplifier. FIGS. 5, 6, 7 and 8 illustrate various structures capable of providing this result. These are all in cross-section.

Figure 5:
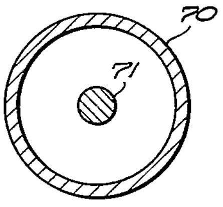
FIGS. 5, 6, 7 and 8 illustrate in cross-section a number of configurations of the two conductors of the invention.
Figure 6:
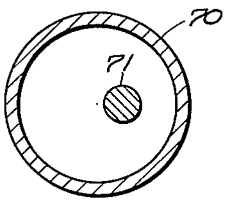
Figure 7:
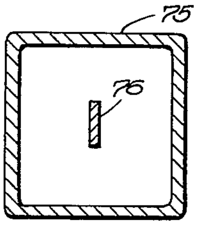
Figure 8:
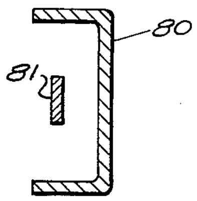

FIG. 5 shows an inner conductor 71 concentrically located in the cylindrical outer conductor 70. FIG. 6 shows this inner conductor located in another, non-concentric, position in the outer conductor 70. FIG. 7 shows a square-shaped outer conductor 75 with a flat or rectangular cross-sectional inner conductor 76. FIG. 8 shows an outer conductor 80 which only partially circumferentially surrounds an inner conductor 81; either or both of these could be round or oval in cross-section, as well as rectangular, as shown. Each of these structures can be made to possess the electrical property of a field confining structure which constrains all frequencies used in it to propagate at approximately the same velocity.

It will be appreciated that in a given embodiment of the invention, the only critical dimension is the length L of the section of the amplifier cavity including the inner conductor 11. This section should be effectively a quarter-wave or any other odd number of quarter waves long electrically at the signal frequency.

As is mentioned above, the internal conductor 11 constrains all the used frequencies to approximately the same propagation velocity. Since the cavity section including the inner conductor is a resonant structure (one or another odd number of quarter-waves long) at the signal frequency a spurious signal of double that frequency would present a low voltage to the diode 12 located at or near a high-voltage (antinode) point for the signal frequency.

Some additional characteristics and advantages of the invention are:

(*a*) being essentially a "tank," it will, when inserted in the feed line to a radio receiver and resonated to the receiver frequency, act as a band pass filter with little or no change in receiver sensitivity or noise figure; the introduction of pump power simply constitutes this filter a low noise amplifier of the receiver input signal;

(*b*) the pumping energy may be introduced at a place where the diode 12 or other voltage-variable reactance device is a low impedance or a high impedance as desired; it is, therefore, easy to arrange for a series or a parallel pumping circuit, as desired;

(*c*) the cavity can be filled with a dielectric other than air, such as oil, with corresponding change in frequency characteristics.

Devices built according to the invention make very simple and straightforward radio frequency amplifiers which are characterized by extremely low noise. Signal-to-noise improvements as much as 6 db over prior art devices have been obtained with devices according to the invention.

Other modifications and embodiments of my invention will occur to those who are skilled in the art. The foregoing description of certain embodiments thereof is by way of example only, and not intended to limit the scope of the appended claims.

What is claimed is:

1. In a microwave amplifier, the combination comprising a conductive housing, conductor means extended substantially along an axis of said housing for providing a coaxial system to propagate energy at a signal frequency, at least one semiconductor diode having a nonlinear capacitive characteristic coupled between the extended end of said conductor means and said housing, means connected to said conductor means for tuning the system to a resonant frequency equal to said signal frequency, means coupled to said diode for varying the capacitance thereof at a higher frequency of a pump power, and means coupled to said conductor means for coupling out of said housing an amplified signal at said signal frequency.

2. In a microwave amplifier, the combination comprising a conductive housing, conductor means extending substantially along an axis of said housing for providing a coaxial system having an inductive reactance to propagate energy at a signal frequency, at least one semiconductor diode having a nonlinear capacitive characteristic coupled between the extended end of said conductor means and said housing, a variable capacitor connected between said conductor means and said housing for manually tuning the system to a resonant frequency equal to said signal frequency, means coupled to said diode for varying the capacitance thereof at a higher frequency of a pump power, and means coupled to said conductor means for coupling out of said housing an amplified signal at said signal frequency.

3. In a microwave amplifier, the combination comprising a conductive housing, conductor means extended substantially along an axis of said housing for providing a coaxial system having an inductive reactance to propagate energy at a signal frequency, a semiconductor diode having a nonlinear capacitive characteristic coupled between the extended end of said conductor means and said housing, a variable capacitor connected between said conductor means and said housing for manually tuning the system to a resonant frequency equal to said signal frequency, means coupled to said diode for varying the capacitance thereof at a higher frequency of pump power, means to adjust the physical length of said conductor means within said housing for resonance to a third frequency intended to be the idler frequency which will be present during amplification of signals with said pump power, and means coupled to said conductor means for coupling out of said housing an amplified signal at said signal frequency.

4. In a microwave amplifier, the combination comprising a conductive housing, conductor means extended substantially along an axis of said housing for providing a coaxial system having an inductive reactance to propagate energy at a signal frequency, a semiconductor diode having a nonlinear capacitive characteristic mounted at one electrode to the extended end of said conductor means and having its other electrode extending toward said housing, a variable capacitor connected between said conductor means and said housing for manually tuning the system to a resonant frequency equal to said signal frequency, means coupled to said diode for varying the capacitance thereof at a higher frequency of pump power, means to adjust the physical length of said conductor means within said housing for resonance to a third frequency intended to be the idler frequency which will be present during amplification of signals with said pump power, and means coupled to said conductor means for coupling out of said housing an amplified signal at said signal frequency.

5. In a parametric amplifier, the combination comprising: a section of two-conductor transmission line of the type in which a first conductor provides a field-confining housing at least in part surrounding a second conductor extended substantially parallel to an axis of said housing for providing a system to propagate energy in a substantially coaxial mode at a signal frequency, at least one semiconductor diode having a nonlinear capacitive characteristic coupled between the extended end of said second conductor and said housing, means connected to said second conductor for tuning the system to a resonant frequency equal to said signal frequency, means coupled to said diode for varying the capacitance thereof at a higher frequency of pump power, and means coupled to said system for coupling out of said housing an amplified signal at said signal frequency.

6. Parametric amplifier according to claim 5 in which said first conductor is rectangular in cross-section.

7. Reactance amplifier comprising an outer field-confining electrical conductor, an elongated inner electrical conductor disposed within said outer conductor and forming therewith a transmission line section the electrical length of which is dimensioned to support standing waves therein of electromagnetic wave energy in a substantially coaxial mode at a given frequency of signals intended to be amplified to a level below the oscillation threshold, a nonlinear capacitance device mounted on and connected at one electrical terminal to said inner conductor and capacitively coupled at another electrical terminal to the outer conductor, whereby movement of said inner conductor relative to said outer conductor does not affect the electrical coupling between said nonlinear capacitance device and said outer conductor, means coupled to said nonlinear capacitance device for varying the capacitance at a second higher frequency of pump power, means to adjust the length of said inner conductor for resonance to a third frequency intended to be the idler frequency which will be present during amplification of signals with said pump power, means connected to said conductors for independently tuning said transmission line section to a resonant frequency equal to said signal frequency, and input and output signal frequency terminals coupled to said amplifier.

8. Reactance amplifier comprising a cylindrical closed conductive envelope forming a cavity, an inner coaxial conductor, said conductor comprising two telescopically interfitting parts of which a first is mounted at one end on an end wall of said envelope and the second is axially movable with respect to the first, a nonlinear capacitance device mounted on said second part of said inner conductor near the free end thereof and coupled capacitively to the inner wall of said envelope, means for tuning said transmission line section for resonance to a signal frequency, means coupled to said nonlinear capacitance device for varying the capacitance thereof at a second higher frequency of pump power, means independently to adjust said second part of said inner conductor axially relative to said first part for resonance to a third frequency intended to be the idler frequency which will be present during amplification of signals with said pump power, and input and output signal frequency terminals coupled to said amplifier.

References Cited in the file of this patent

UNITED STATES PATENTS

| | | |
|---|---|---|
| 2,423,327 | Lafferty | July 1, 1947 |
| 2,561,417 | Ryan et al. | July 24, 1951 |
| 2,616,037 | Wheeler et al. | Oct. 28, 1952 |
| 2,617,038 | Russell | Nov. 4, 1952 |
| 2,719,223 | Van der Ziel et al. | Sept. 27, 1955 |
| 2,815,488 | Von Neumann | Dec. 3, 1957 |
| 2,848,694 | Zaleski et al. | Aug. 19, 1958 |
| 2,929,033 | Ellis | Mar. 15, 1960 |
| 2,936,369 | Lader | May 10, 1960 |

OTHER REFERENCES

Weiss: Physical Review, vol. 107, No. 1, July 1, 1957, page 317.

Artman et al.: "Physical Review," Feb. 15, 1958, pages 1392–1393.

Autler et al.: "Physical Review," April 1, 1958, pages 280–281.

Heffner et al.: "Proceedings of the IRE," June 1958, page 1301.

Chang et al.: "Proceedings of the IRE," July 1958, pages 1383–1386.